Oct. 9, 1956  F. E. GILMORE  2,766,104
CONTINUOUS WEIGHING MECHANISM FOR SOLIDS
Original Filed Sept. 15, 1950  2 Sheets-Sheet 1

INVENTOR.
F. E. GILMORE
BY
Hudson and Young
ATTORNEYS

INVENTOR.
F. E. GILMORE
BY
Hudson and Young
ATTORNEYS

United States Patent Office 2,766,104
Patented Oct. 9, 1956

2,766,104

CONTINUOUS WEIGHING MECHANISM FOR SOLIDS

Forrest E. Gilmore, Bartlesville, Okla., assignor to Phillips Petroleum Company, a corporation of Delaware Original application September 15, 1950, Serial No. 185,086. Divided and this application December 15, 1952, Serial No. 326,026

10 Claims. (Cl. 23—284)

This invention relates to a novel apparatus for weighing continuously moving granular materials. In one aspect, it relates to an apparatus for weighing or indicating the continuity of flow of pebbles in a pebble heater system. In another aspect, it relates to an apparatus for the indication of continuity of flow or indication of an interruption in the flow of pebbles in a pebble heater system.

This application is a division of my copending application Serial No. 185,086, filed September 15, 1950, and now Patent No. 2,652,141.

An object of this invention is to provide an apparatus for indicating continuously the flow of pebbles in a pebble heater system.

Another object of this invention is to provide an apparatus for continuously weighing a stream of pebbles flowing in a continuously operating pebble heater system.

Still another object of this invention is to provide an apparatus for indicating the rate of flow of pebbles in a continuously operating pebble heater system.

Still another object of this invention is to devise an apparatus which is inexpensive to construct and to operate for achieving the above mentioned objects.

Many other objects and advantages of my continuously operating weighing apparatus will be realized upon reading the following disclosure.

Figure 1:
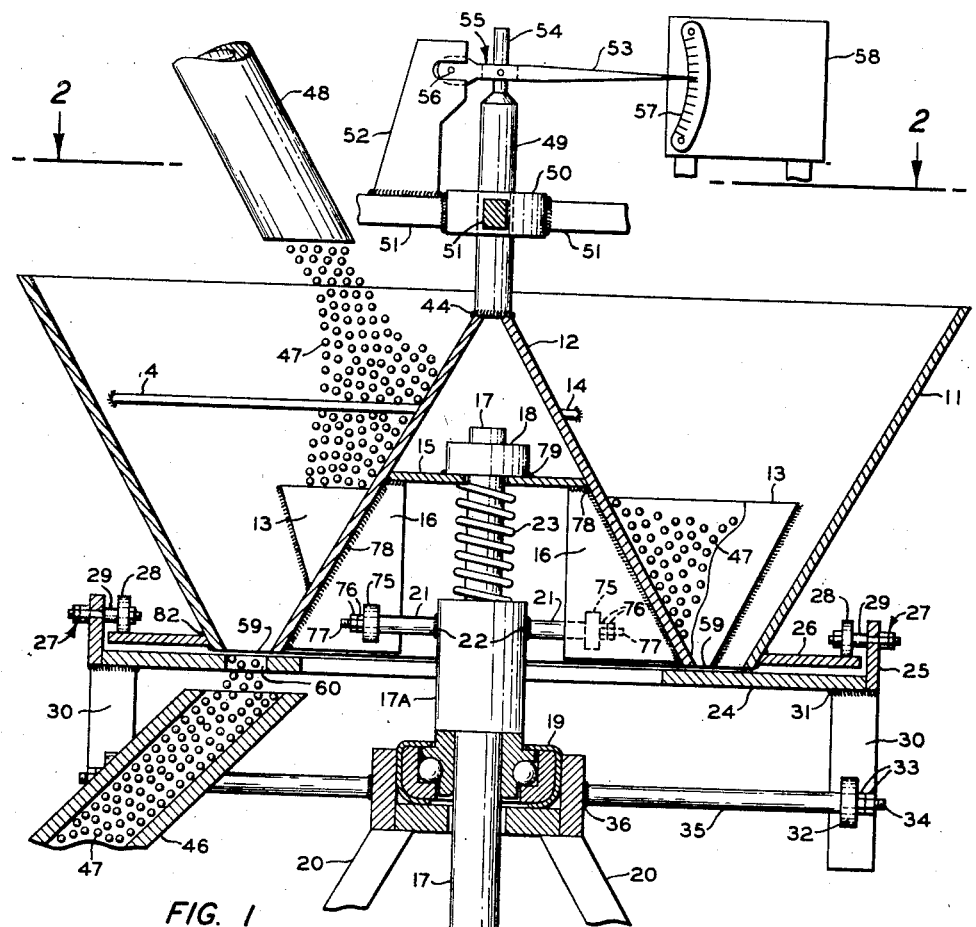
Figure 2:
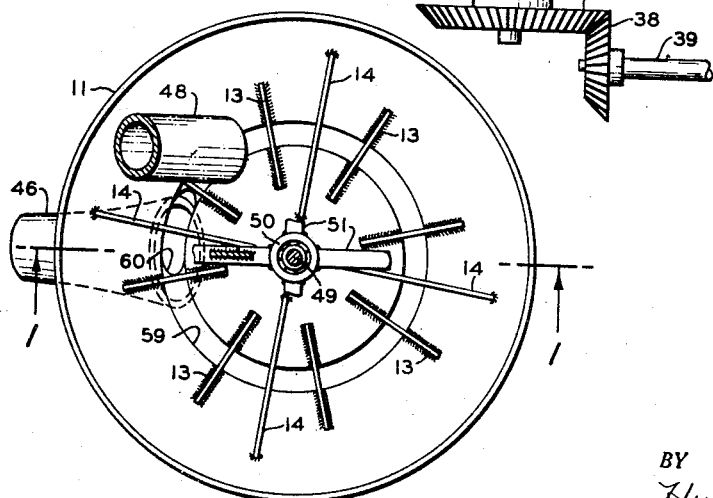
Figures 3, 4, 5:
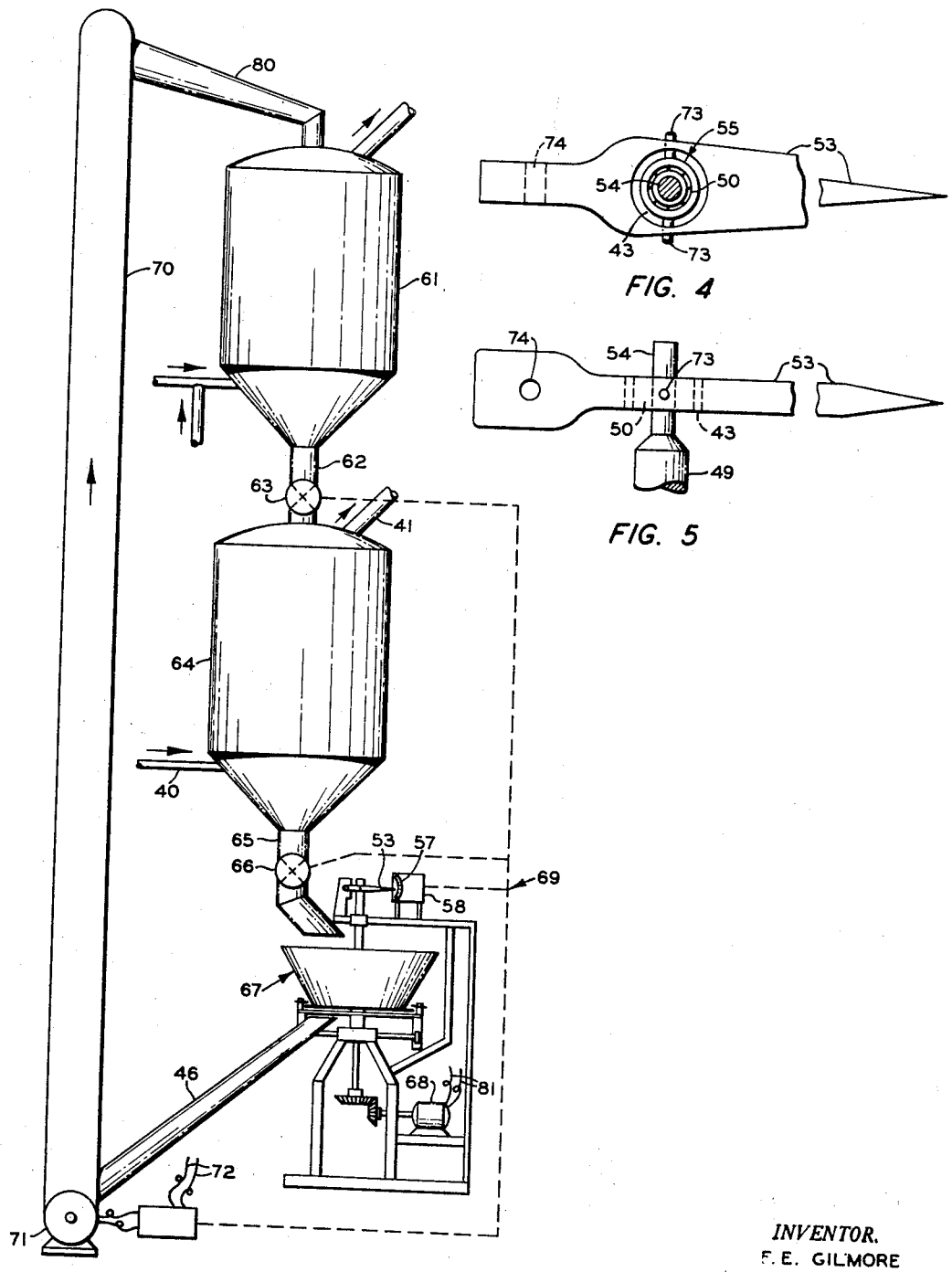

In the drawing, Figure 1 is an elevational view, partly in section, of the apparatus of my invention and taken on the line 1—1 of Figure 2. Figure 2 is a plan view of the apparatus of my invention taken on the line 2—2 of Figure 1. Figure 3 is an assembly of apparatus parts embodying the apparatus of my invention. Figure 4 is a plan view of one portion of the apparatus of my invention. Figure 5 is an elevational view of the portion of apparatus of Figure 4.

In such process systems as those termed "pebble heater systems," one of the important points of the operation is the ability to control or to regulate the flow of pebbles in any or all parts of the system. If pebble stoppage is occasioned by the choking or failure of an elevator, such difficulty is quickly discovered by an operator. If pebble stoppage is occasioned by bridging in a pebble heater vessel, that is, a vessel in which the pebbles are heated, it may be difficult to determine exactly at what point in the system the choking has occurred. In like manner, with bridging or failure to flow of pebbles in the reaction or conversion chamber, it likewise may be difficult to determine the exact point of stoppage. The transfer of pebbles from one piece of equipment to another is always, or usually, in a closed conduit and, of course, the flow of pebbles cannot be observed visually. Hence, some mechanical means is necessary to determine or measure the flow of pebbles. While it may be advantageous in some cases to use a pebble flow or weighing apparatus at the top of a system, that is, between the top of an elevator and the pebble heating vessel, such a positioning of the indicating apparatus is inconvenient for observation since such a point is usually quite high from the ground. A rate of flow determining apparatus, when inserted between the pebble heater and the reaction chamber, is also usually a considerable distance above the ground. The apparatus in this latter location also then is called upon to contact or indicate the rate of transfer of pebbles at the highest temperature of the pebbles at any point in the system. It is obvious that a more desirable point for installation of the rate of flow indicating apparatus is at some point at which the pebbles are at the lowest temperature or near the lowest temperature within the system. However, for illustrative purposes, in Figure 3 I have shown the installation of the weighing apparatus of my invention at a point below the reaction vessel. Such an apparatus, as indicated broadly by reference numeral 67 in Figure 3, is illustrated in detail in Figures 1 and 2.

Referring now to Figure 1, the apparatus consists, in part, of an inverted frusto-conical member 11 which is disposed with its largest diameter upward. Within this frusto-conical member is disposed a conical member 12, the apex of which points in an upward direction. The diameter of the open end of this conical member 12 is shorter than the diameter of the small end of the inverted frusto-conical member 11 so that an annular opening 59 exists between the lowest points of these two conical members. These two conical members are rigidly attached to each other by some rods or braces 14 and some plates or partitions 13. The plates 13 represent such a type of geometrical figure that they fit into the lower portion of the space between the two conical members, as illustrated. Plates 13 are welded to the cones for rigidity. The rods or bars 14 may be welded or otherwise rigidly attached to the inner surface of the frusto-conical member and the outer surface of the conical member, as illustrated. The opening 59 is intended to have a sufficiently great width that the pebbles to be weighed in this apparatus can readily flow through the opening provided, irrespective of the rate of flow of the pebbles. Immediately below a portion of the opening or annular space 59 is an opening 60 in a plate 24. The plate 24 is, of course, intended to be sufficiently close to the lower ends of the conical members that the pebbles or other granular material being weighed cannot leak from the opening 59 radially between the bottom of the conical members 11 or 12 and the plate 24. This plate 24 is held in position by several apparatus parts, of which plate 26 is a circular ring or annulus. This ring or plate 26 is welded to the outer surface of the frusto-conical member 11 at points 82 as indicated in the drawing. The outer edge of the plate 24 is provided with a flange 25 which extends upwardly. Through this flange 25 are a number of openings through which bolt assemblies 27 may be inserted. Resting upon the top of the annular plate 26 are some rollers 28 which are supported by the bolt assemblies 27. A collar or separator 29 holds the roller 28 at a proper distance from the rim 25 so that the plate 24 will not fall from its intended position. As many of these bolt roller assemblies 27 as necessary may be provided along the rim 25 to hold the plate 24 in its intended position.

The conical members 11 and 12 are intended to rotate, and this rotation is effected through the shaft 17 to which rods 21 are rigidly attached at weld points 22. The rods 21 are provided with rollers 75 which may be held in place by some lock nuts 76 upon the shouldered and threaded end 77 of the rod 21. These rollers bear against some plates 16 which are for the most part triangular in shape and are rigidly attached to the inner surface of the upright conical member 12. From Figure 1 it may be seen that as shaft 17 rotates, rods 21 force the rollers 75 against plates 16 and when the force is sufficient, the conical members rotate.

To support the dead weight of these conical members and their attached rods and plates there is provided a horizontally disposed plate 15. This plate 15, if desired, may be a circular plate held rigidly in position by weld points 78, or this plate 15 may be triangular in shape and attached to the inner surface of the conical member 12 by, for example, three weld points. In this manner, access may be had to the space above the top of the plate 15. The plate 15 may be quadrangular or other shape, as desired.

Extending through an opening in the center portion of the plate 15 is the shaft 17. The top end of the shaft 17 is surrounded by a bearing 18 which, in turn, may be attached to the top of the plate 15 by weld points 79. This bearing, of course, may be attached to this plate by any other means, but welding is stated as an exampel of a satisfactory means. Below the uppermost portion of the shaft 17 is an enlarged section 17A which rests upon a bearing 19. This bearing 19 is intended to support the weight of this apparatus with its load of granular material being weighed. The bearing 19 is, in turn, supported by a rigid support member 20 which may be attached to a conventional foundation on the ground or on other structural apparatus as desired. Between the upper end of the enlarged shaft section 17A and the lower side of the plate 15 is a helical compression spring 23. This spring is a substantial spring and is intended to carry the weight of the conical members and associated parts with the load of granular material being weighed.

In the operation of this apparatus, the compression of the spring 23 is proportional to its load of pebbles, and the compression of the spring or shortening of its axial length is indicative of the weight of the charge of pebbles between the two conical members. As the spring 23 is compressed, the plate 15 and bearing 18 are pushed downward toward the enlarged shaft section 17A and it is intended that the shaft 17 may easily slide longitudinally through bearing 18. The shaft 17 at its lower end is provided with a bevel gear 37, which, in turn, meshes with bevel gear 38. This latter bevel gear is provided with a shaft 39 which is intended to transmit rotational motion from a source of power, not shown, to the bevel gear 38. Upon rotation of gear 38, gear 37 rotates, of course, in the opposite direction and, in turn, rotates shaft 17 and rods 21 force rollers 75 against the plates 16 to turn or rotate the weighing apparatus. The gears 37 and 38 may be keyed to their respective shafts or may be shouldered.

The closure plate apparatus 24 was mentioned hereinbefore as being a nonrotatable plate. This plate is nonrotatable even though its weight is supported by the rotating plate 26. To prevent the plate 24 from rotating, several plates 30 extend downward from the bottom side of plate 24. Bearing against these plates 30 are some rollers 32 which are supported on the ends of rods 35 and held in operative position by lock nuts 33 on the threaded ends 34 of the shouldered rods 35. As the compression spring 23 is compressed or distended the entire weighing apparatus, including the nonrotatable plate 24 and the plates 30, moves downward or upward. As these plates 30 move, the rollers 32 operate so that the rods 35 or the plates 30 will not wear unduly. The rods 35 are rigidly attached to the main base support element 20, which, as mentioned before, is rigidly supported by a base or bases on the ground or by structural elements. The rods 35 may be attached to this base element 20 by welding, as at points 36, if desired.

A conduit 46 is provided as illustrated to receive the solid granular material as it flows continuously from the apparatus. The annular space 59 between the two conical sections as mentioned hereinbefore is a space sufficiently large to pass easily the material being weighed and the plate 24 is held sufficiently close to these conical sections that granular material cannot pass between the conical sections and the plate. The opening 60 provided in the plate 24 is positioned at a proper location so that the granular material may be discharged from the weighing apparatus and conducted away through the conduit 46. When weighing pebbles in such a pebble heater system, these pebbles are referred to in the drawing by reference numeral 47. As may be observed from Figure 2, the opening 60 is provided in such a manner as to conform to the opening 59 at the proper location. A number of partitions 13 are illustrated in Figure 2, for example, eight of these parts were inserted in the drawing at approximately 45 degrees intervals. These parts prevent circumferential movement of the material being weighed. The top portion of the conduit 46 may be flared or more or less funnel shaped so as to receive the solid material from the entire area or the opening 60. A conduit 48 is shown above the weighing apparatus through which solid material to be weighed passes for addition to the weighing apparatus.

As mentioned hereinbefore, the compression spring 23 is intended to carry the dead weight of the weighing apparatus and the weight of the solid material being weighed. As the compression spring is compressed or extended, a shaft 49 which is attached to the apex of the conical member 12 by welds 44 moves downward or upward. Since the apparatus with its charge of pebbles is relatively heavy, the compression spring must be a substantial spring and such a spring is usually constructed so that compression does not unduly shorten the spring. Or, in other words, the movement of the upper end of the spring with respect to its lower end is not a great distance. I have provided an indicating apparatus illustrated in conjunction with the shaft 49 to magnify the vertical movement of the weighing apparatus. This magnifying indicator apparatus consists of a bearing 50 supported rigidly by support members 51 which, in turn, are supported from a foundation on the ground or to any nonmovable structural member. This bearing 50 with its support members 51 is intended to eliminate any horizontal movement of the upper portion of the weighing apparatus. The shaft 17 in its position with respect to plate 15 prevents that portion of the weighing apparatus from making horizontal movements and the shaft 49 and bearing 50 eliminate rocking or other undesirable movement from occurring so that the entire apparatus will rotate around an axis which is the axis of the shaft 17 and of the shaft 49.

One of the support members 51 also supports a vertically disposed plate 52 which is perforated to accommodate a pivot 56. A pointer 53 has an opening 74 through which the pivot 56 extends so that the pointer 53 is free to move at least some distance around pivot 56 as a center. The upper end of the shaft 49 is provided as a shaft extension 54 of smaller diameter than that of the support shaft 49. A circular opening 43 (Figures 4 and 5) is provided in the pointer arm 53 as illustrated. Mounted within this opening is a pivoted bearing 50. The bearing support pivots 73 extend through small openings in the pointer 53 as may be seen in Figures 4 and 5. These pivots 73 permit the pointer 53 to rotate vertically upward and downward while the bearing 50 remains horizontal. An opening in the center of the bearing 50 is provided for insertion of the small diameter end 54 of the shaft 49. This bearing 50 permits the shaft end 54 to rotate while, at the same time, the weighing apparatus may move vertically upward or vertically downward and the pivot points 73 transmit this movement from the bearing 50 to the pointer 53. The end of the pointer 53 is provided with a graduated scale 57 so that the position of the pointer 53 may be observed and/or recorded. This scale 57 is supported rigidly upon support member 58 which, in turn, may be supported by structural members extending from the ground or from other rigid structural members, not shown. This bearing pivot assembly is identified in the drawing by reference numeral 55.

In Figure 3, the weighing apparatus of my invention is illustrated in operative arrangement with a pebble heater apparatus. The weighing apparatus is identified broadly by reference numeral 67. The pebble heater apparatus consists of a vessel 61 in which the pebbles are heated. Hot pebbles flow through conduit 62 under the influence of a valve 63 which may be a star or other type valve suitable for permitting gravity flow of such solid material as pebbles. Vessel 64 is the reaction or heating vessel in which materials to be processed are heated to reaction or conversion temperature. This vessel may also be used merely as a process preheater, if desired. The materials are either in liquid or vapor form and enter vessel 64 through line 40 and leave the vessel through line 41. Pebbles from this heater vessel 64 pass through conduit 65 under the influence of a star or other type valve 66 into the weighing apparatus. In Figures 2 and 3, the pebbles are shown as being added to the weighing apparatus through conduits 48 and 65, respectively, into the same side of the weighing apparatus as is positioned the opening 60 in the plate 24. This relative positioning may best be seen in Figures 1 and 2. In these figures conduit 48 is positioned relatively close to the opening 60 so that a large portion of the weighing apparatus will be fully loaded with pebbles for as nearly equal distribution of weight as possible. If half of the circumference of the weighing apparatus were filled with pebbles, an excessive load would be thrown on bearing 50 and shaft 49 and also on bearing 18 and the top of shaft 17. Thus, by providing for more nearly equal distribution of weight around the circumference of the weighing apparatus, less load and, of course, less wear is experienced by these two bearings. However, the apparatus is operable under the other conditions mentioned when, for example, one-half the circumference, more or less, of the apparatus is filled with pebbles being weighed. From the opening 60 the pebbles discharge into the conduit 46 and are conducted to the bottom of an elevator 70. This elevator is illustrated in Figure 3 as a mechanical elevator but any type of elevator suitable for the purpose of elevating hot pebbles or other solid material under the conditions of operation of such a system as herein disclosed may be used. The elevator discharges the pebbles into the chute 80 which, in turn, conveys the pebbles into the top of the heater chamber 61. Such an elevator as herein illustrated may be powered by an electric motor 71 operated by electricity from a power line 72.

The indicator of my apparatus may, if desired, be used as a visible indicator so that an operator can observe the rate of flow of pebbles from the bottom of the vessel 64. However, if desired, this pointer 53 may be a portion of an indicator-control assembly 69 under which conditions if the flow of pebbles from conduit 65 into the weighing apparatus 67 (Figure 3) is retarded for any reason whatever this control apparatus, upon rise of the end of the pointer 53, operates to increase the rate of rotation of the star valve 63 and increase the rate of flow of pebbles. This control apparatus accordingly operates to retard the rate of rotation of the star valve 63 when the weight of the pebbles in the weighing apparatus becomes greater than a predetermined weight.

This automatic control feature may be constructed so as to operate, for example, the star valve 66 or any other pebble flow control apparatus in any point in the system. The illustration of the control apparatus as controlling the speed of rotation of the star valve 66 is given merely as an example.

The weighing apparatus through the shaft 17 and bevel gears 37 and 38 and shaft 39 is rotated by an electric motor 68 which receives its power through lines 81. This weighing apparatus 67 may be rotated by any other type of motive power desired but the use of electrical power is convenient. In like manner, the elevator 70 may be operated by any kind of power but, as mentioned, the use of electrical power is convenient.

The speed of rotation of the weighing apparatus 67 may be adjusted so that the volume of the pebbles in the apparatus will preferably not extend above the tops of the partition plates 13, or at least not much above the tops of these plates. When the level of the pebbles in the weighing apparatus is kept even with or below the top of the plates 13, pebbles cannot flow from one compartment between one pair of plates 13 into another compartment between other plates 13.

If this weighing apparatus is to weigh pebbles in a large capacity system, the weighing apparatus may merely be made of large size. Increased capacity may also be obtained by rotating the weighing apparatus 67 at a greater speed, for example, if the apparatus 67 is rotated at 6 R. P. M. and under such conditions if the pebble bed is too deep in the weighing apparatus the speed of the motor 68 may be so increased as to increase the speed of the weighing apparatus 67 to, for example, 10 R. P. M. under which conditions the bed depth of pebbles will be less. Maximum speed under which accurate weighing for indicating or recording the control purposes may be determined for each installation as necessary.

Materials of construction of this weighing apparatus may, in general, be selected from those commercially available and suitable for use under such conditions. The conditions of operation will be well understood by those skilled in the pebble heating art. The pebbles being weighed, however, will ordinarily be at a relatively high temperature. If the pebble outlet temperature of vessel 64 is, for example, 800° to 1400° F., then that will be approximately the temperature of the pebbles being weighed in the apparatus. The actual temperature will, of course, be slightly less since some cooling will occur during the weighing operation. If desired, the portion of the weighing apparatus containing the pebbles may be partially or completely enclosed to prevent undue loss of heat from the pebbles. Such enclosing apparatus is not shown for purposes of simplicity.

If it is desired to know and to record the actual weight of the pebbles in the weighing apparatus, the pointer end scale apparatuses 53 and 57, respectively, may be calibrated into graduations on the scale 57 marked "pounds," "pounds per minute" or, for example, "tons per hour." When calibrated to indicate tons per hour, the figure will, of course, mean that the pebbles are being weighed at the rate of the indicated number of tons per hour. This latter type of calibration will, in most installations, be preferable. Such a continuous weighing mechanism may be used for weighing many materials in transit, as for example, granular or crushed ore, coal, cement making material, cement clinker, or most any solid material which can flow into and out of my apparatus.

The particular apparatus design described herein is given for illustrative purposes and should not be regarded as limiting the invention, the scope of which is set forth in the following claims.

Having described my invention, I claim:

1. A pebble heater conversion apparatus comprising, in combination, a pebble heater vessel, a vessel for heating materials to undergo reaction disposed below said pebble heater vessel, a conduit for transfer of hot pebbles from said heater vessel to the reaction vessel, an elevator to elevate pebbles from a point below said reaction vessel to the top of said heater vessel, a continuous pebble weighing assembly disposed below said reaction vessel, a conduit extending from the bottom of the reaction vessel to the top of said weighing assembly for passage of pebbles from the reaction vessel to said weighing assembly, a flow control valve in the conduit for passage of pebbles from the bottom of the reaction vessel, and means responsive to the weight of pebbles in said weighing assembly to control the operation of said flow control valve, and a conduit for passing pebbles from said weighing assembly to the bottom of said elevator.

2. A pebble heater conversion apparatus comprising, in combination, a pebble heater vessel, a vessel for heating materials to undergo reaction disposed below said pebble heater vessel, a conduit for transfer of hot pebbles from said heater vessel to the reaction vessel, an elevator to elevate pebbles from a point below said reaction vessel to the top of said heater vessel, a weighing apparatus for continuously weighing pebbles disposed below said reaction vessel, a conduit extending from the bottom of the reaction vessel to the top of said weighing apparatus for passage of pebbles from the reaction vessel to said weighing apparatus, a conduit for passage of pebbles from said weighing apparatus to the bottom of said elevator, a flow control valve in said conduit for transfer of hot pebbles from said heater vessel to said reaction vessel, and means responsive to the weight of pebbles in said weighing apparatus to control the operation of said flow control valve.

3. A pebble heater conversion apparatus comprising, in combination, a pebble heater vessel, a vessel for heating materials to undergo reaction disposed below said pebble heater vessel, a conduit for transfer of hot pebbles from said heater vessel to the reaction vessel, an elevator to elevate pebbles from a point below said reaction vessel to the top of said heater vessel and a continuous pebble weighing assembly disposed below said reaction vessel, said continuous pebble weighing assembly comprising, in combination, a horizontally disposed circular conveyor rotatable around a vertical axis, a rotatable shaft coinciding with said axis and adapted to rotate said conveyor, means for rotating said shaft, a conduit extending from the bottom of the reaction vessel to the top of said circular conveyor for gravity flow of pebbles, a compression spring adapted to support said conveyor and material to be weighed, an indicator responsive to vertical movement of said conveyor and a conduit leading from the bottom of said conveyor to the bottom inlet of said elevator.

4. The pebble heater assembly of claim 3 wherein the compression spring is a helical spring and surrounds said shaft.

5. A pebble heater conversion apparatus comprising, in combination, a pebble heater vessel, a vessel for heating material to undergo reaction disposed below said pebble heater vessel, a conduit for transfer of hot pebbles from said heater vessel to the reaction vessel, an elevator to elevate pebbles from a point below said reaction vessel to the top of said heater vessel, a continuous pebble weighing assembly disposed below said reaction vessel, said continuous pebble weighing apparatus comprising, in combination, an inverted hollow frusto-conical member, an upright hollow rotatable conical member disposed within and rigidly connected to said frusto-conical member, the larger diameter end of said conical member having a smaller diameter than the small diameter end of said frusto-conical member, the open end of the conical member and the small diameter end of the frusto-conical member lying in a common horizontal plane, the space between the open end of the conical member and the small diameter end of the frusto-conical member forming an open annular space, a non-rotatable closure plate disposed below and adjacent said annular space, an opening in said plate, a conduit for transfer of pebbles from the bottom of said reaction vessel to the space between the conical members, a rotatable shaft coinciding with the axis of the conical member, said shaft being adapted to rotate said conical member, power means for rotating said shaft, a compression spring being adapted to support said conical members as a rotatable assembly and granular material to be weighed, an indicator responsive to vertical movement of said assembly and a conduit extending from the underside of the opening in said closure plate to the bottom inlet of said elevator for gravity flow of pebbles.

6. A pebble heater conversion apparatus, comprising, in combination, a pebble heater vessel, a vessel for heating materials to undergo reaction disposed below said pebble heater vessel, a conduit for transfer of hot pebbles from said heater vessel to the reaction vessel, an elevator to elevate pebbles from a point below said reaction vessel to the top of said heater vessel, a weighing apparatus for continuously weighing pebbles disposed below said reaction vessel, said weighing apparatus comprising, in combination, a horizontally disposed circular conveyor rotatable around a vertical axis, a rotatable shaft coinciding with said axis and being adapted to rotate said conveyor, means for rotating said shaft, a conduit for transfer of pebbles from the bottom of said reaction vessel to said conveyor, a compression spring being adapted to support said conveyor and material to be weighed, an indicator responsive to vertical movement of said conveyor, a conduit for passage of pebbles from said conveyor to the bottom inlet of said elevator, a flow control valve in said conduit for transfer of hot pebbles from said heater to said reaction vessel, and means responsive to said indicator to control the operation of said flow control valve.

7. The apparatus of claim 6 wherein the compression spring is a helical spring and surrounds the shaft.

8. A pebble heater conversion apparatus comprising, in combination, a pebble heater vessel, a vessel for heating materials to undergo reaction disposed below said pebble heater vessel, a conduit for transfer of hot pebbles from said heater vessel to the reaction vessel, an elevator to elevate pebbles from a point below said reaction vessel to the top of said heater vessel, a weighing apparatus for continuously weighing pebbles disposed below said reaction vessel, said weighing apparatus comprising, in combination, an inverted hollow frusto-conical member, an upright hollow rotatable conical member disposed within and rigidly connected to said frusto-conical member, the larger diameter end of said conical member having a smaller diameter than the small diameter end of said frusto-conical member, the open end of the conical member and the small diameter end of the frusto-conical member lying in a common horizontal plane, the space between the open end of the conical member and the small diameter end of the frusto-conical member forming an open annular space, a non-rotatable closure plate disposed below and adjacent said annular space, an opening in said plate, a conduit for transfer of pebbles from the bottom of said reaction vessel to the space between the conical member and the frusto-conical member, a conduit for passage of pebbles from said opening in said closure plate to the bottom inlet of said elevator, a rotatable shaft coinciding with the axes of the conical members, said shaft adapted to rotate said conical members, power means for rotating said shaft, a helical compression spring surrounding said shaft and adapted to support said conical members as a rotatable assembly and granular material to be weighed, an indicator responsive to vertical movement of said assembly, a flow control valve in said conduit for transfer of hot pebbles from said heater vessel to said reaction vessel, and means responsive to said indicator to control the operation of said flow control valve.

9. A pebble heater conversion apparatus comprising, in combination, a pebble heater vessel, a vessel for heating materials to undergo reaction disposed below said pebble heater vessel, a conduit for transfer of hot pebbles from said heater vessel to the reaction vessel, an elevator to elevate pebbles from a point below said reaction vessel to the top of said heater vessel, a weighing apparatus for continuously weighing pebbles disposed below said reaction vessel, said weighing apparatus comprising, in combination, an inverted hollow frusto-conical member, an upright hollow rotatable conical member disposed within and rigidly connected to said frusto-conical member, the larger diameter end of said conical member having a smaller diameter than the small diameter end of said frusto-conical member, the open end of the conical member and the small diameter end of the frusto-conical member lying in a common horizontal plane, the space between the open end of the conical member and the small diameter end of the frusto-conical member forming an open annular space, a non-rotatable closure plate disposed below and adjacent said annular space, an opening in said plate, a conduit for transfer of pebbles from the bottom of said reaction vessel to the space between the conical member and the frusto-conical member, a rotatable shaft coinciding with the axes of the conical members, said shaft adapted to rotate said conical members, power means for rotating said shaft, a compression spring adapted to support said conical members as a rotatable assembly and granular material to be weighed, an indicator responsive to vertical movement of said assembly, a conduit for passage of pebbles from said opening in said closure plate of said weighing apparatus to the bottom inlet of said elevator, a flow control valve in said conduit for transfer of hot pebbles from said heater vessel to said reaction vessel, and means responsive to said indicator to control the operation of said flow control valve.

10. A pebble heater conversion assembly comprising, in combination, a pebble heater vessel, a vessel for heating materials to undergo reaction disposed below said pebble heater vessel, a conduit for transfer of hot pebbles from said heater vessel to the reaction vessel, an elevator to elevate pebbles from a point below said reaction vessel to the top of said heater vessel and a continuous pebble weighing apparatus disposed below said reaction vessel, said weighing apparatus comprising, in combination, an inverted hollow frusto-conical member, an upright hollow rotatable conical member disposed within and rigidly connected to said frusto-conical member, the larger diameter end of said conical member having a smaller diameter than the small diameter end of said frusto-conical member, the open end of the conical member and the small diameter end of the frusto-conical member lying in a common horizontal plane, the space between the open end of the conical member and the small diameter end of the frusto-conical member forming an open annular space, a nonrotatable closure plate disposed below and adjacent said annular space, an opening in said plate, a conduit for passage of granular material from the bottom of the reaction vessel to the space between the conical member and the frusto-conical member, a rotatable shaft coinciding with the axes of the conical members, said shaft adapted to rotate said conical members, power means for rotating said shaft, a compression spring adapted to support said conical members as a rotatable assembly and granular material to be weighed, an indicator responsive to vertical movement of said assembly and a conduit for passage of pebbles from the opening of the closure plate of said weighing assembly to the bottom inlet of said elevator.

References Cited in the file of this patent
UNITED STATES PATENTS

| 2,432,872 | Ferro | Dec. 16, 1947 |
| 2,619,256 | Wiley | Nov. 25, 1952 |
| 2,662,665 | Harper | Dec. 15, 1953 |